US011651562B2

(12) United States Patent
Yerli

(10) Patent No.: US 11,651,562 B2
(45) Date of Patent: May 16, 2023

(54) METHOD AND SYSTEM FOR ENABLING ENHANCED USER-TO-USER COMMUNICATION IN DIGITAL REALITIES

(71) Applicant: TMRW Foundation IP S. À R.L., Luxembourg (LU)

(72) Inventor: Cevat Yerli, Frankfurt am Main (DE)

(73) Assignee: TMRW Foundation IP S. À R.L., Luxembourg (LU)

(*) Notice: Subject to any disclaimer, the term of this patent is extended or adjusted under 35 U.S.C. 154(b) by 0 days.

(21) Appl. No.: 17/138,656

(22) Filed: Dec. 30, 2020

(65) Prior Publication Data

US 2021/0201588 A1 Jul. 1, 2021

Related U.S. Application Data

(60) Provisional application No. 62/955,232, filed on Dec. 30, 2019.

(51) Int. Cl.
*G06T 19/00* (2011.01)
*G06T 7/73* (2017.01)
(Continued)

(52) U.S. Cl.
CPC ............ *G06T 19/006* (2013.01); *G06F 3/011* (2013.01); *G06T 7/75* (2017.01); *G06V 40/176* (2022.01);
(Continued)

(58) Field of Classification Search
CPC .... G06T 7/70; G06T 7/73; G06T 7/75; G06T 2219/024; G06K 9/00315; G06K 9/00342; G06F 3/048–04897
See application file for complete search history.

(56) References Cited

U.S. PATENT DOCUMENTS 9,990,770 B2   6/2018  Anderson
2008/0215972 A1*  9/2008  Zalewski ............... A63F 13/35
                                                    715/706
(Continued)

FOREIGN PATENT DOCUMENTS

JP   2902352 B2 *  6/1999
JP   2902352 B2    6/1999
(Continued)

OTHER PUBLICATIONS

Extended European Search Report dated May 26, 2021, issued in corresponding European Application No. 202170793, 9 pages.
(Continued)

*Primary Examiner* — Diane M Wills
(74) *Attorney, Agent, or Firm* — Christensen O'Connor Johnson Kindness PLLC

(57) ABSTRACT

A method for enabling the enhanced user-to-user communication in digital realities comprising generating a marker of a target user that is persistently applied on the target user; detecting, through a wireless network, the presence of a target user device and counterpart user device connected to the server via the wireless network; sending a notification to the counterpart user device informing about the presence of the target user device based on a set of rules; receiving one or more forms of interaction from the counterpart user device on the marker of the target user; opening up a communication channel between the counterpart user device and target user device; and receiving, processing and accordingly redirecting corresponding communications through and between the counterpart user device and target user device. A system thereof is also disclosed.

18 Claims, 7 Drawing Sheets

(51) Int. Cl.
*G06F 3/01* (2006.01)
*G06V 40/16* (2022.01)

(52) U.S. Cl.
CPC .............. *G06T 2207/30208* (2013.01); *G06T 2219/024* (2013.01)

(56) References Cited

U.S. PATENT DOCUMENTS

| | | |
|---|---|---|
| 2008/0215994 A1 | 9/2008 | Harrison et al. |
| 2013/0031475 A1* | 1/2013 | Maor ..................... G06Q 10/10 715/706 |
| 2016/0100034 A1 | 4/2016 | Miller |
| 2017/0039774 A1 | 2/2017 | Estable |
| 2019/0139309 A1 | 5/2019 | Lo et al. |
| 2019/0180507 A1* | 6/2019 | Gordon ............... G06F 3/04845 |
| 2019/0222975 A1* | 7/2019 | Panec ..................... H04W 4/80 |

FOREIGN PATENT DOCUMENTS

| | | |
|---|---|---|
| JP | 2010-535363 A | 11/2010 |
| JP | 2018007828 A | 1/2018 |
| JP | 2018196735 A | 12/2018 |
| WO | 2008/108965 A1 | 9/2008 |

OTHER PUBLICATIONS

Office Action dated Apr. 12, 2022 issued in Japanese Application No. 2020-215760, 10 pages.

Office Action dated Dec. 30, 2021, in corresponding Indian application No. 202014056470, 6 pages.

Office Action dated Aug. 30, 2022 issued in Japanese Application No. 2020-215760, (Japanese version) 5 pages.

* cited by examiner

METHOD AND SYSTEM FOR ENABLING ENHANCED USER-TO-USER COMMUNICATION IN DIGITAL REALITIES

CROSS-REFERENCE TO RELATED APPLICATION

This application claims the benefit of U.S. Provisional Application No. 62/955,232, filed Dec. 30, 2019, which is incorporated herein by reference.

BACKGROUND

The present disclosure generally relates to computer systems and methods, and more specifically to a method and system enabling user-to-user communication within digital realities.

Technology developments for providing digital reality content to users have enabled experiences that were not possible in the past. Particularly, digital realities, such as augmented reality (AR), virtual reality (VR), and mixed reality (MR), change a user's perception on what they are seeing, hearing, and feeling, and how much of the real world comes into these experiences, providing the user with a sensation of a physical presence in places in the real world or an imagined world.

Nevertheless, certain technological aspects, such as telecommunication methods, have not caught up with the technological trends linked to the implementation of digital realities. Thus, although remote communication methods between people have been expanded from traditional phone calls to text messaging and video calls through a network such as the Internet, employing different applications through a variety of communication protocols, current telecommunications typically diminish the quality of interactions as would be when compared to communication in person. For example, people might want to discuss from a distance without necessarily approaching each other because of time or other constraints. Further in this example, an employee in an office building from a building complex may want to talk to a colleague or located in another building within the complex. In this situation, the employees may make a phone or video call, which may diminish the quality of the interaction as compared to a personal encounter.

In other examples, people walking on the streets are obliged to yell at each other or make hand signals in order to be noticed by the other person. In some cases, people may even need to text or call each, especially in a crowded or unknown area. Even though some applications implement the geolocation tracking of a user device into a real-time map through GPS or other global navigations satellite system, it may still be hard to find the other in crowded or unknown areas. Thus, any interaction before the actual personal encounter may be limited to the current methods of calling, texting or video calls, adding up to the difficulty of finding each other.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One or more drawbacks in the background are solved by a method, system and non-transitory computer-readable media of the current disclosure enabling an enhanced user-to-user communication in digital realities.

A method for enabling the enhanced user-to-user communication in digital realities is implemented by a server comprising memory and at least one processor, and comprises generating a marker of a target user that is associated with (e.g., persistently applied on) the target user and presented in a virtual world system; detecting presence in the virtual world system of a target user device and counterpart user device connected to the server via a wireless network; sending a notification to the counterpart user device informing about the presence of the target user device in the virtual world system based on a set of rules; receiving one or more forms of interaction from the counterpart user device on the marker of the target user in the virtual world system; opening up a communication channel (e.g., a digital audio channel, a digital video channel, a text chat application, or a combination thereof) between the counterpart user device and target user device responsive to the one or more received forms of interaction; and receiving and directing corresponding communications between the counterpart user device and target user device via the communication channel.

The user devices may be one or more of a mobile phone, laptop, wearable computer, mobile game console, head-mounted display, see-through device, digital reality glasses (e.g., augmented reality, virtual reality or mixed reality glasses), smart contact lenses supporting digital realities, and the like. The user devices connect to the server through a wireless network such as the Internet, and are tracked through standard geopositioning methods or combinations of geopositioning methods with inertial tracking methods from sensor data obtained from the user devices.

In some embodiments, the memory of the server stores a persistent virtual world system comprising virtual replicas of corresponding real world elements. In yet a further embodiment the marker is an interactive virtual shape generated by retrieving from the persistent virtual world system the respective users' virtual replicas and superimposing versions of the virtual replicas on the corresponding counterpart user and/or target user. Such versions may in some embodiments be "life-size" for a particular user in the sense of being approximately equivalent to the size of a user as viewed by another user. The persistent virtual world system may thus store a virtual replica of each user, which may be visible to the counterpart user, e.g., after augmentations by the server. In some embodiments, each user device comprises a unique identifier, wherein the corresponding virtual replica of the user is associated to the unique identifier.

In some embodiments, the marker may further be any other type of interactive virtual shape, such as a pointer, an icon positioned on top of the target user, or an outline. Selection of the type of marker may be configured by a system administrator or by the target user by accessing the system through a user device connected through the network.

In some embodiments, the notification sent to the counterpart user device is performed by virtually augmenting the marker of the target user with at least one distinctive characteristic comprising one or more distinctive colors, lighting effects, sounds, shapes, or haptic sensations perceptible through the counterpart user device. This way, the target user can be easily located by the counterpart user, even amongst large crowds or in unknown areas.

In some embodiments, the set of rules from which the notification to the counterpart user device is based comprises specific entitlements based on social connections between users, interest zones comprising one or more interests assigned to one or more predetermined geographic zones, individual user interests, a distance factor, availability configuration settings, or combinations thereof, triggering the user notifications when users meet one or more of the specific set of rules. In further embodiments, the server may be further configured to access one or more user social media profiles from corresponding social networks in order to retrieve one or more data associated to the set of rules. In other embodiments, the memory of the server further stores user profile information, comprising preferences, social connections, social behavior, etc. In other embodiments, the server may combine information accessed from social networks and information available in the memory of the server. In an embodiment of the set of rules being based on an interest zone, the interest zone may refer to a zone where only people with specific common interests may be enabled to communicate. In an embodiment of the set of rules being based on individual user interests, only users with common interests (e.g., hobbies, career, etc.) may be enabled to communicate through the methods of the current disclosure. In an embodiment of the set of rules being based on a distance factor, users that are at a predetermined distance from each other may be enabled to communicate through the methods of the current disclosure. In an embodiment of the set of rules being based on an availability and privacy configuration, only users that mark themselves as available may be notified in order to communicate through the methods of the current disclosure. In some embodiments, availability may be configured only for certain users, such as, for example, users with close social connections, such that no strangers can view any correspondingly private information. It is important to note that the above notifications set of rules can be configured individually or in combination, such as only showing users of a certain social connection at a determined distance, or only displaying certain individual user interests in a specific interest zone. Furthermore, it is important to note that the notification set of rules and notification database are connected and can be configured together by a user in order to be able to customize the corresponding notifications based on the set of rules, such as assigning determined types of notification to determined types of rules.

In some embodiments, once the counterpart user has determined the presence of the target user through the notification, the one or more forms of interaction applied by the counterpart user on the marker of the target user comprise at least one of looking (e.g., while wearing head-mounted display, digital reality glasses, or smart contact lenses), tapping or clicking (e.g., with a touch-enabled device or mouse); pointing, grabbing, pinching, or swiping (e.g., with a hand gesture, touchscreen, or mouse); interaction through voice, interaction through text, other hand or facial gestures or movements, or combinations thereof.

In some embodiments, opening up the communication channel between the counterpart user device and target user device responsive to the one or more received forms of interaction comprises generating and sending an invitation to the target user device and, if the invited target user accepts the invitation, receiving, from the invited target user, an invitation confirmation. Upon the server receiving a form of interaction from the counterpart user device on the marker of the target user, the server generates and sends an invitation to the target user device. In yet a further embodiment, the server may further embed media content on the invitation, such as one or more virtual objects, texts, videos, sounds, haptic sensations, mini-games, and the like. The invitation may further comprise links to external content comprising media content. If the invited target user accepts the invitation, the server receives, from the invited target user, an invitation confirmation input by the target user through the corresponding user device, opening up the communication channel between the counterpart user device and target user device. The target user may also have the option to refuse the invitation, which triggers the server to notify the counterpart user about such a rejection.

In some embodiments, the notification sent to the counterpart user device and the communications between the counterpart user and target user are perceptible despite the presence of solid physical matter between the counterpart user device and target user by, in a digital reality system in which the solid physical matter is replicated with 3D structure data, virtually adding transparency to the 3D structure data of the respective solid physical matter stored in the persistent virtual world system. For example, the notification may be perceived by the counterpart user through other users in an area, by virtually enabling the counterpart user to see through virtual replicas of other users, walls, or natural formations that may, in a normal situation, block the view between the counterpart user and target user. Thus, as the target user device is tracked by the server, the augmentations on the marker can be placed anywhere within a predetermined distance of the counterpart user. Likewise, during communications between the users, the communications can be perceived to go through the physical matter, such as where representations of two users are on opposite sides of a wall in a virtual world system, but can still see or hear each other.

In some embodiments, communications between users are enabled in augmented reality, virtual reality, or combinations thereof. In an embodiment of virtual reality, the server superimposes virtual replicas of a persistent virtual world system on respective real world elements (e.g., with the virtual replicas matching corresponding position and orientation of the real world elements) in order to generate a virtual world that corresponds to the real world.

In some embodiments, during communications between the counterpart user and target user, the server is further configured to retrieve from sensors on the counterpart user device and/or target user device, external sensor devices, or combinations thereof, sensor data associated with facial expressions, body language, or other physical characteristics of the users, as well as physical characteristics from elements of the real world; and update the virtual replica of the corresponding user and/or of the real world. In yet a further embodiment, the method further comprises virtually placing the virtual replica of the corresponding user in spatial proximity to simulate a close-range communication (e.g., facing each other, beside one another, in the same room, etc.). Likewise, in virtual reality, the users may also have the option to bring each other closer for simulating a close-range communication. In some examples, the counterpart user may be viewing the target other user in augmented reality, while the target user may be virtually present at the location of the counterpart user in virtual reality. In alternative embodiments related to situations where not enough sensor devices may be available to scan and output on virtual replicas the corresponding user expressions, the server can be further configured to simulate expressions based on the tone of voice of the user and the words uttered by the user.

In some embodiments, communications are enabled between human users, artificial reality users, or combinations thereof, through communication channels enabling communications through sharing of audio, video, text, and hand or facial gestures or movements. Thus, for example, the persistent virtual world system may comprise a plurality of artificial intelligence virtual assistants that may be represented by virtual avatars with which human users may communicate in augmented or virtual reality.

In an alternative embodiment, when the virtual replica of a user or a corresponding marker is not stored in the persistent virtual world system, the markers in the form of a virtual replica are generated "on the fly" by, when the target user is within the field of view of the counterpart user, scanning, through visual sensors on the counterpart user device, the 3D shape of the target user; and creating, from the scanned 3D shape, a 3D virtual approximation of the 3D shape that is superimposed on the target user and adjusted to the position and orientation of the counterpart user. The virtual replica may thus be stored in the persistent virtual world system in the server and may be available for a later interaction. In a further embodiment, said scanning is further performed on at least one portion of the real world within the field of view of the counterpart user in order to generate a virtual replica of said at least one portion of the real world, which may be used to update or provide further data of virtual world elements to the persistent virtual world system. Thus, in order to generate the virtual replicas of users, of real-world places, or combinations thereof, the system may combine using elements already stored in the server with sensor data obtained in real-time.

In an embodiment, a system for enabling enhanced user-to-user communication in digital realities (e.g., a virtual world system) comprises a server comprising memory and at least one processor, the server being configured to generate a marker of a target user that is superimposed on the target user; detect, through a wireless network, the presence of a target user device and counterpart user device connected to the server via the wireless network; send a notification to the counterpart user device informing about the presence of the target user device based on a set of rules; receive one or more forms of interaction from the counterpart user device on the marker of the target user; open up a communication channel between the counterpart user device and target user device responsive to the one or more received forms of interaction; and receive, process and accordingly direct corresponding communications through and between the counterpart user device and target user device via the communication channel.

In an embodiment, provided are one or more non-transitory computer-readable media having stored thereon instructions configured to cause a server computer system comprising memory and at least one processor to perform a method for enabling communication (e.g., in a virtual world system), comprising the steps of: generating markers of respective users from a plurality of positional and orientational data points obtained from a first user device and a target user device; detecting the presence of the first user device and target user device connected to the server via the wireless network; sending a notification to the first user device informing about the presence of the target user device based on a set of rules; receiving a form of interaction from the first user device on the marker of the target user; opening up a communication channel between the user device and target user device in response to the received form of interaction; and receiving, processing and accordingly directing corresponding communications through and between the user device and target user device via the communication channel.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages of the present disclosure will be apparent from the accompanying drawings and from the detailed description that follows below.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
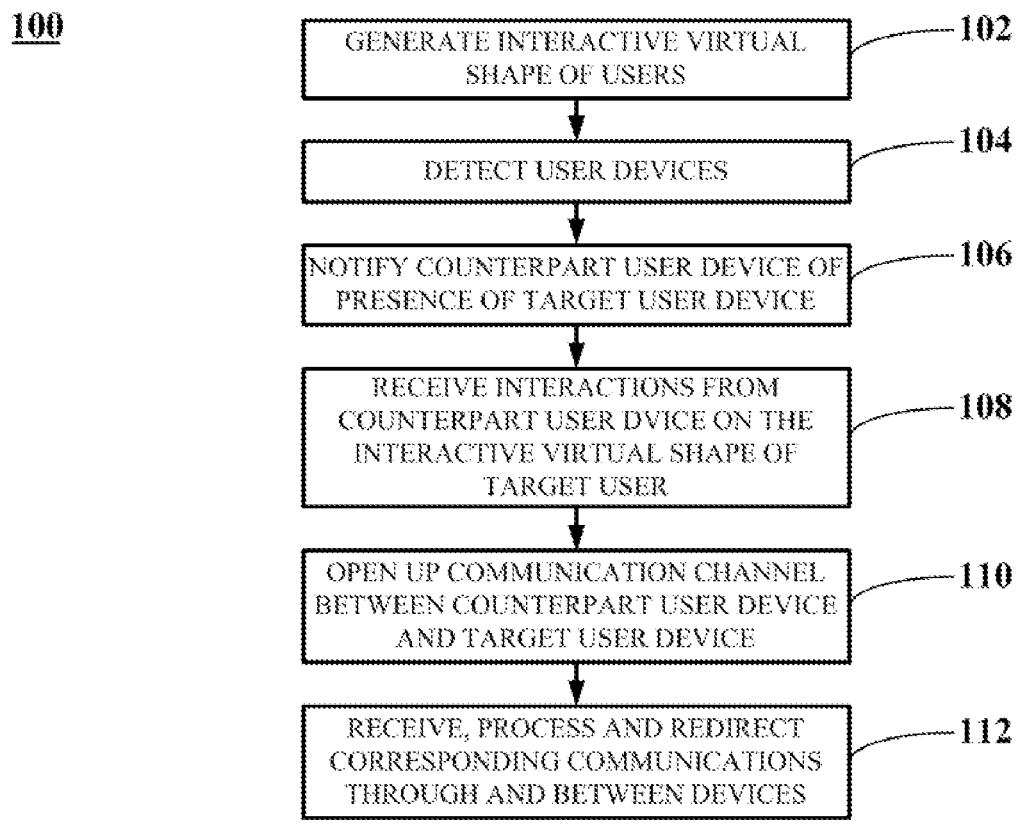
FIG. 1 depicts a method enabling user-to-user communication within digital realities, according to an embodiment.

FIG. 1 depicts a method 100 enabling user-to-user communication within digital realities, according to an embodiment.

The method 100 for enabling the enhanced user-to-user communication in digital realities is implemented, in this example, by a server comprising memory and at least one processor. Alternatively, the method 100 or other methods described herein can be implemented by one or more computing devices of various types, such as a server computer system comprising multiple server computers. The method 100 starts in step 102 by generating a marker of a target user that is associated with (e.g., persistently applied on) the target user. In some embodiments, the memory of the server stores a persistent virtual world system comprising virtual replicas of corresponding real world elements. In yet a further embodiment the marker is an interactive virtual shape generated by retrieving from the persistent virtual world system the respective user's virtual replica and superimposing a life-size version of the virtual replicas on the corresponding counterpart user and/or target user, such that in the virtual world system the replicas move and/or are oriented to match the users movements and/or orientation in the real world. The persistent virtual world system may thus store a virtual replica of each user, which may be visible or perceptible to the counterpart user after augmentations by the server. In some embodiments, each user device comprises a unique identifier, wherein the corresponding virtual replica of the user is associated to the unique identifier.

For purposes of simplification, in the current disclosure, users are classified into counterpart users and target users. The counterpart user may refer to a user that makes a first attempt to come into contact with a target user upon receiving a notification from the server. However, it may be understood that any one or both users be considered as counterpart users or target users, as, for example, both users may simultaneously attempt to reach out to the other user. Thus, the counterpart user device and target user device may refer to the same type of user device. In this sense, the server may send a notification to both user devices, and any or both of the users may react to the notification through a form of interaction on the marker of the other user. Furthermore, for purposes of simplification, the counterpart user and target user are referred to in the singular form, but it may be understood that there may be a plurality of counterpart users and a plurality of target users with a respective plurality of user devices, which may enable group communications.

In the current disclosure, the term "persistent" is used to characterize a state of a system that can continue to exist without a continuously executing process or network connection. For example, the term "persistent" may be used to characterize the virtual world system where the virtual world system and all of the virtual replicas therein comprised continue to exist after the processes used for creating the virtual replicas, purely virtual objects and digital reality applications cease, and independent of users being connected to the virtual world system. Thus, the virtual world system is saved in a non-volatile storage location, e.g., in the server. In this way, virtual replicas may interact and collaborate with each other when being configured for accomplishing specific goals even if users are not connected to the server.

"Real world elements", as used in the current disclosure, refers to elements found in the real world which may be sensed by sensing mechanisms. For example, the real-world elements may be moving or static entities found in the real world, including human beings, vehicles, buildings, objects, recreation areas, natural formations, and streets, amongst others. In the current disclosure, the term "virtual replica" refers to virtual representations (e.g., in a virtual world system) of real-world elements.

The method continues in step 104 by detecting, through a network and by using one or more of various standard tracking methods, the presence of a target user device and counterpart user device connected to the server via the network. Subsequently, the method 100 continues in step 106 by sending a notification to the counterpart user device informing about the presence of the target user device based on a set of rules. In some embodiments, the notification sent to the counterpart user device based on the notification set of rules is performed by virtually augmenting the marker of the target user with at least one distinctive characteristic comprising one or more distinctive colors, lighting effects, sounds, shapes, or haptic sensations perceptible through the counterpart user device.

The distinctive characteristics may be stored in the memory of the server and may be associated to one or more rules from said set of rules. For example, in embodiments where the marker is a superimposed virtual replica retrieved from the persistent virtual world system, the virtual replica may be a transparent version of the corresponding user which may be thereafter augmented by the server through said at least one distinctive characteristic. In another example, the notification may be in the form of a ringing comprising sound being emitted from the counterpart user device. In other examples, the notification can be a combination of sound (e.g., ringing, beeping, music or voice), vibration, and video. Thus, the notification alerts the counterpart user of the presence of a target user nearby by, for example, highlighting the target user for the counterpart user with the at least one distinctive characteristic. This way, the target user can be easily located by the counterpart user, even amongst large crowds or in unknown areas. For example, the marker of the target user may be viewed through a head-mounted display of a counterpart user as a yellow aura glowing around the target user while simultaneously producing a distinctive sound and/or haptic sensation (e.g., a vibrating alert).

In some embodiments, the set of rules from which the notification to the counterpart user device is based comprises specific entitlements based on social connections between users, interest zones comprising one or more interests assigned to one or more predetermined geographic zones, individual user interests, a distance factor, availability configuration settings, or combinations thereof, triggering the user notifications when users meet one or more of the specific set of rules. In further embodiments, the server may be further configured to access one or more user social media profiles from corresponding social networks in order to retrieve one or more data associated to the set of rules. In other embodiments, the memory of the server further stores user profile information, comprising preferences, social connections, social behavior, etc. In other embodiments, the server may combine information accessed from social networks and information available in the memory of the server.

In step 108, the method 100 continues by receiving one or more forms of interaction from the counterpart user device on the marker of the target user. In some embodiments, the one or more forms of interaction applied by the counterpart user on the marker of the target user comprise at least one of looking (e.g., while wearing head-mounted display, digital reality glasses, or smart contact lenses), tapping or clicking (e.g., with a touch-enabled device or mouse); pointing, grabbing, pinching, or swiping (e.g., with a hand gesture, touchscreen, or mouse); interaction through voice, interaction through text, other hand or facial gestures or movements, or combinations thereof.

In some embodiments, upon the server receiving a form of interaction from the counterpart user device on the marker of the target user, the method 100 further comprises generating and sending an invitation to the target user device, which the target user may refuse or accept. In yet a further embodiment, the server may further embed media content on the invitation, such as one or more virtual objects, texts, videos, sounds, haptic sensations, mini-games, and the like. The invitation may further comprise links to external content comprising media content. If the invited target user accepts the invitation, the server receives, from the invited target user, an invitation confirmation input by the target user through the corresponding user device, opening up the communication channel between the counterpart user device and target user device. The target user may also have the option to refuse the invitation, which triggers the server to notify the counterpart user about such a rejection, preventing the communication channel to be opened.

Then, in step 110, the method continues by opening up a communication channel (e.g., a digital audio channel, a digital video channel, a text chat application, or a combination thereof) between the counterpart user device and target user device. In some embodiments, communication channels enable communications through sharing of audio, video, text, and hand or facial gestures or movements.

In some embodiments, communications are enabled between human users, artificial reality users, or combinations thereof. Thus, for example, the persistent virtual world system may comprise a plurality of artificial intelligence virtual assistants that may be represented by virtual avatars with which human users may communicate in augmented or virtual reality.

In some embodiments, during communications between the counterpart user and target user, the server is further configured to retrieve sensor data from sensors on counterpart user device, target user device, external sensor devices, or combinations thereof, sensor data associated with facial expressions and body language or physical characteristics of the users and/or from real-world elements; and update the life-size virtual replica of the corresponding user and/or of a corresponding portion of the real world. For example, the sensor data may be retrieved from visual sensors included in depth cameras, SLAM scanners, or Internet of Things (IoT) devices installed close to the users using artificial intelligence-based machine vision for scanning and recognizing human expressions. For example, a counterpart user may, in augmented reality, communicate with a target user located at 50 meters away from each other. As the distance between users is too large, the users may have the option to simulate a close-range communication by placing the life-size virtual replica of the corresponding user in front of each other. Since the life-size virtual replica is updated in real-time through the sensor data, the facial expressions and body language of the respective users may be perceived and simulated right in front of the counterpart user, enhancing communications between each other. In alternative embodiments related to situations where sensor devices may not be available to scan and output on the life-size virtual replica the corresponding user expressions, the server can be further configured to simulate expressions based on the tone of voice of the user and the words uttered by the user, which may be achieved by training artificial intelligence algorithms with a plurality of labelled and/or unlabeled data sets comprising samples of voice tones and associated corresponding expressions.

Finally, in step 112, the method ends by receiving, processing and accordingly directing corresponding communications between the counterpart user device and target user device via the communication channel.

Figure 2:
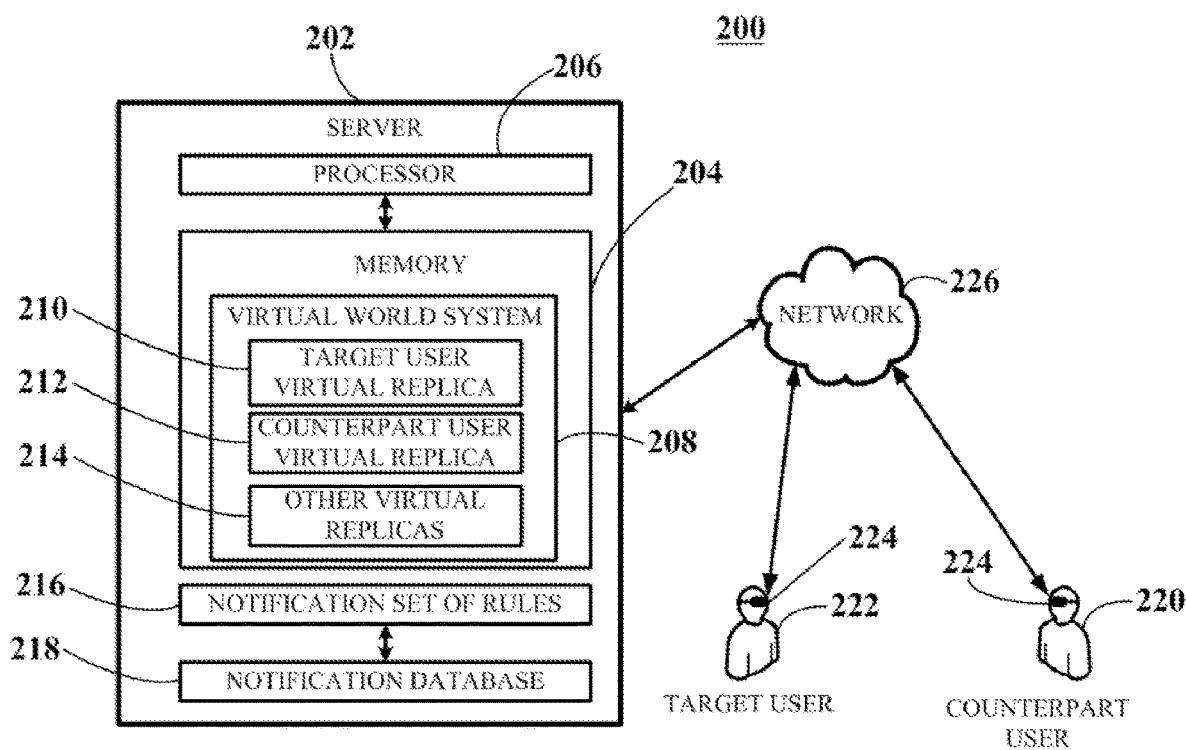
FIG. 2 depicts a system enabling user-to-user communication within digital realities, according to an embodiment.

FIG. 2 depicts a system 200 enabling user-to-user communication within digital realities, according to an embodiment.

The system 200 may comprise a server 202 including memory 204 and at least one processor 206. The memory stores a persistent virtual world system 208 comprising one or more target user virtual replicas 210, counterpart user virtual replicas 212, and other virtual replicas 214. The memory 204 further stores one or more notification sets of rules 216 associated to a notification database 218. In the current disclosure, for example, in the descriptions of FIGS. 3-6 whenever referring to "the server" and "the system", reference is made for ease of illustration to the current server 202 and system 200 described in FIG. 2, but other servers, or server systems comprising multiple server computers, may be used to implement functionality or techniques described herein.

Users, comprising a target user 222 and a counterpart user 220 wearing or employing respective user devices 224, may connect to the server 202 via a network 226 (e.g., a wireless network) in order to access the different computer programs stored in the memory 204 for enabling user-to-user communications within digital realities.

In some embodiments, the system 200 implemented in a cloud to edge infrastructure that may display distributed computing capabilities employing public or private clouds, fog servers, and edge devices and systems, such as enterprise systems, mobile platforms, and user devices, all of which may connect through the network 226. Using a cloud to edge computing network, access to computing power, computer infrastructure (e.g., through so-called infrastructure as a service, or IaaS), applications, and business processes can be delivered as a service to users via client devices on demand. This way, resources including physical servers and network equipment enable a shared storage and computing that may be dynamically allocated depending on factors such as the distance of the user to the resources and the network and computational demand from the users.

In some embodiments, the virtual replicas (e.g., target user virtual replica 210, counterpart user virtual replica 212 and other virtual replicas 214) are developed via a replica editor (not shown) stored in the memory 204. The replica editor is configured to input data and instructions of the virtual replicas into the persistent virtual world system 208. The replica editor may be, for example, a computer-aided drawing (CAD) or computer-aided engineering (CAE) software that may store data and instructions necessary to input, edit and test virtual replicas. The replica editor may enable the input of data and instructions that relate to each digital replica, which describe the shape, location, position and orientation, and physical properties of each replica. The replica editor may comprise modeling tools configured to enable users to build the virtual replicas, which may include 3D game engine software development kits. The modeling tools enable generating virtual replicas with explicit data and instructions based on readily-available CAD or CAE models of the real-world elements. For example, machine owners may provide an administrator of the persistent virtual world system or may input by themselves the already-existing digital CAD or CAE models of their machines. Similarly, building owners may provide building information models (BIM) with building details to be stored in the persistent virtual world system, which may include information that may not be visible or easily obtainable via sensing mechanism. In other embodiments, the modeling tools enable a car or drone-based image-scanning pipeline to be input through a variety of photo, video, depth simultaneous location and mapping (SLAM) scanning in order to model the virtual replicas. In other embodiments, radar-imaging, such as synthetic-aperture radars, real-aperture radars, Light Detection and Ranging (LIDAR), inverse aperture radars, monopulse radars, and other types of imaging techniques may be used to map and model real-world elements before integrating them into the persistent virtual world system. In some embodiments, the virtual replicas of users are created by the users themselves by selecting characteristics of an avatar by inputting the selections through the user devices 224. The avatar may be configured by the respective users to be similar to the user or to include other characteristics unrelated to the user.

The user devices 224 may be one or more of a mobile phone, laptop, wearable computer, mobile game console, head-mounted display, see-through device, digital reality glasses (e.g., augmented reality, virtual reality or mixed reality glasses), smart contact lenses supporting digital realities, and the like. The user devices 224 connect to the server through the network 226 such as the Internet, and are tracked through standard geopositioning methods or combinations of geopositioning methods with inertial tracking methods from sensory data obtained from the user devices.

In some embodiments, a virtual replica 108 includes one or more of 3D world and building data, such as SLAM or derivate-mapping based data; 3D geometry data; 3D point cloud data; or geographic information system data representing real-world structural properties that may serve to model a 3D structure for digital reality applications.

In some embodiments, the other virtual replicas 212 refer to virtual replicas of other real-world elements, such as buildings, natural formations, streets, devices, and the like. For example, the persistent virtual world system 208 may refer to a virtual copy of a plurality of real-world elements at least one part of the real world, such as a city, comprising a plurality of other virtual replicas 212 as well as user virtual replicas.

In some embodiments, the network 226 refers to a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), and wireless fidelity (WiFi), satellite, mobile ad-hoc network (MANET), and the like.

In some embodiments, in order to reduce hardware and network demands, contribute to the reduction of network latency, and improve the general digital reality experience, the system may connect through a network including millimeter-wave (mmW) or combinations of mmW and sub 6 GHz communication systems, such as through 5th generation wireless systems communication (5G). In other embodiments, the system may connect through wireless local area networking (Wi-Fi). Provided communication systems may allow for low (e.g., about 1 to about 5 millisecond) end-to-end (E2E) latency and high (e.g., about 1-10 Gbps) downlink speeds to end points in the field, complying with parameters necessary for executing the typically highly-interactive digital reality applications and enabling a real-time communication absent of or with very reduced lag. This results in high-quality, low latency, real-time communication in digital realities. In other embodiments, the system may communicatively connect through 4th generation wireless systems communication (4G), may be supported by 4G communication systems, or may include other wired or wireless communication systems.

In some embodiments, global navigation satellite systems (GNSS), which refers to satellite-based navigation systems like GPS, BDS, Glonass, QZSS, Galileo, and IRNSS, may be used for enabling tracking positioning of user devices 224. Employing signals from a sufficient number of satellites and techniques such as triangulation and trilateration, GNSS can calculate the position, velocity, altitude, and time of user devices 224. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, including, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

In some embodiments, each of the virtual replicas may be geolocated using a reference coordinate system suitable for use with current geolocation technologies. For example, the virtual replicas may use a World Geodetic System standard such as WGS84, which is the current reference coordinate system used by GPS.

Figure 3:
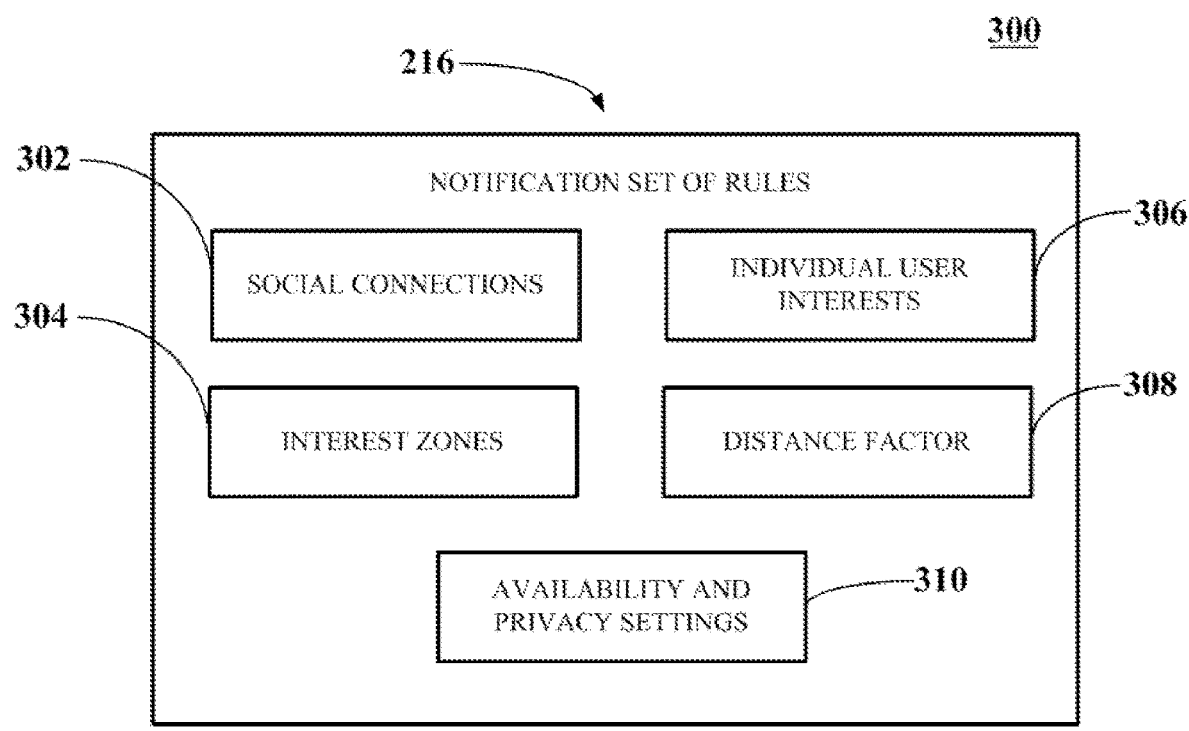
FIG. 3 depicts a set of rules that may be used to determine notifications sent to a counterpart device of the presence of a target user.

FIG. 3 depicts a notification set of rules 216 that may be used to determine notifications sent to a counterpart device of the presence of a target user. Some elements of FIG. 3 may comprise similar elements of FIG. 2, and thus the same or similar reference numbers may be utilized.

The notification set of rules 216 may comprise social connections 302, interest zones 304, individual user interests 306, a distance factor 308, and availability and privacy settings 310, amongst others.

The social connections 302 may comprise, for example, a network of contacts that relate to a user and with which the user may feel compelled to holding communications, such as any friends, family, or acquaintances. In some embodiments, the social connections may be classified according to how close the relation between the user and the respective contacts is. Thus, for example, the server may determine to highlight with a certain color the marker of target users that have a close social connection (e.g., close friends or family) with the counterpart users, and with another color those target users with a farther social connection (e.g., distant acquaintances) with the counterpart user.

The interest zones 304 refer one or more zones where notifications and communications may be enabled only for people with specific common interests. To create an interest zone 304, one or more interests are assigned to one or more predetermined geographic zones using the persistent virtual world system as a basis for the location selection. As each location in the persistent virtual world system is mapped according to the respective location in the real world, each interest zone 304 may be physically comprised within those real world geographical position. For example, a dating zone may refer to a physical area configured such that only users interested in dating to communicate through the methods of the current disclosure; a reading zone may be configured for users interested in reading; and a sports zone may be configured for users interested in sports. In a further embodiment, each interest zone may comprise further interest sub-classifications that can enable further levels of data filtering for notifying counterpart users about the presence of target users. For example, users in a reading zone may get specific notifications about users that have similar reading preferences, so that the markers of these users may be highlighted in a specific color or through other distinctive characteristics when compared to users that have dissimilar tastes. Further in this example, providing the distinctive characteristic when notifying the target user may further comprise providing additional data about the target user related to a shared interest, such as placing virtual labels comprising one or more preferred book categories that may be of interest to the counterpart user. Providing this further information may give users a common background information that can incentivize or facilitate communication between users. In another example, in a dating zone, users having similar tastes, personalities or hobbies may be highlighted with different distinctive characteristics as compared to other users, and may further comprise virtual labels with those matching characteristics to facilitate interactions.

The individual user interests 306 refer to personal interests of users communicating through methods of the current disclosure, such as hobbies, career, preferred languages, etc. In some embodiments, the individual user interests 306 may be used by the interest zones 304 to further filter target users that may be of interest to the counterpart user. In other embodiments, the individual user interests 306 may be used in normal areas of the world in order to easily locate other users with common interests.

The distance factor 308 refers to a distance determined to enable notifications and communication of methods of the current disclosure. For example, the system may be configured to such that only users within a predetermined distance from each other may be notified about the presence of another user.

The availability and privacy settings 310 users that mark themselves as available may be notified in order to communicate through the methods of the current disclosure. In some embodiments, availability may be configured such that notifications and/or information of a user may be accessible only to certain users, such as, for example, to users with close social connections, so that no strangers can view any correspondingly private information about the user.

It is important to note that the above notifications set of rules can be configured individually or in combination, such as only showing users of a certain social connection at a determined distance, or only displaying certain individual user interests in a specific interest zone. Furthermore, and making reference to FIG. 2, it is important to note that the notification set of rules 216 and notification database 218 may be connected and configured together by a user in order to enable customization of the corresponding notifications based on the set of rules 216. For example, a user can determine to assign a specific color to users of a closer social connection 302 and another color to users of a farther social connection 302, or may assign a specific sound, haptic or textual alert for users having a specific individual user interest 306.

In further embodiments, the server may be further configured to access one or more user social media profiles from corresponding social networks in order to retrieve one or more data associated to the notification set of rules 216. In other embodiments, the memory of the server further stores user profile information, comprising preferences, social connections, social behavior, etc., which may be personally input by the users. In other embodiments, the server may combine information accessed from social networks and information available in the memory of the server.

Figure 4A:
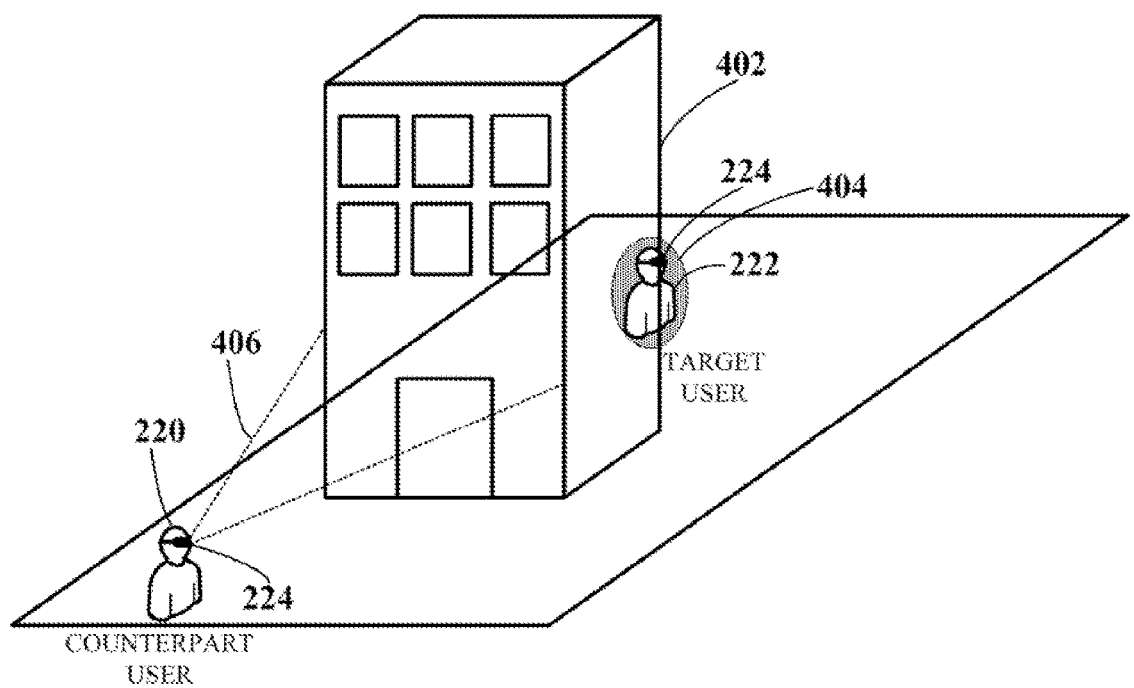
FIGS. 4A-4B depict sample embodiments wherein a counterpart user receives a notification of a target user through solid matter.
Figure 4B:
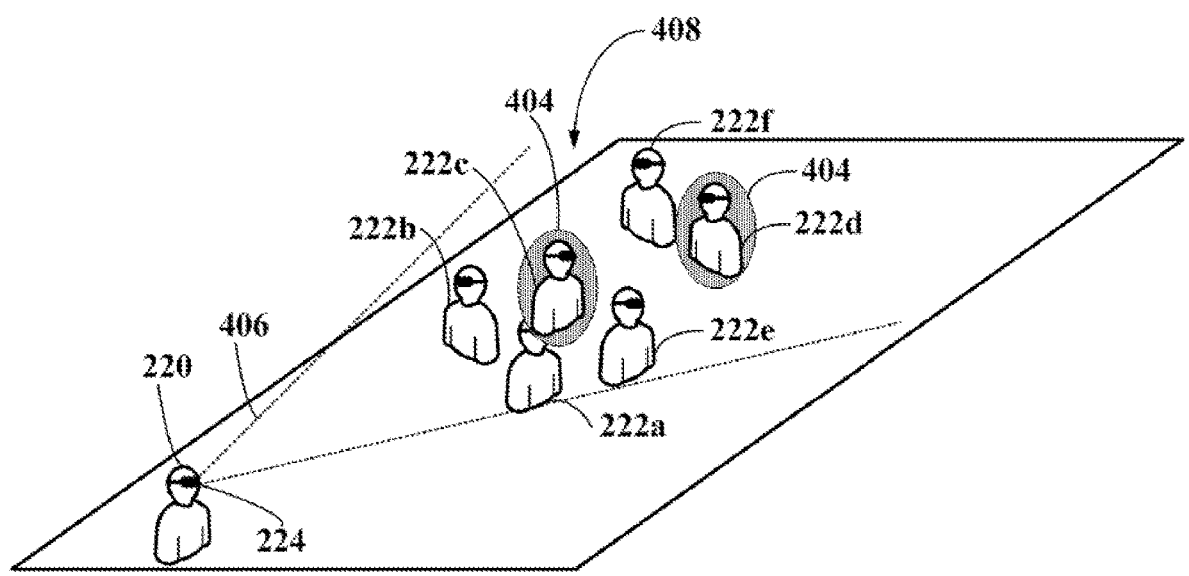

FIGS. 4A-4B depict schematic representations of scenarios 400a-b wherein a counterpart user 220 receives a notification of the presence of one or more target users 222 where, in the real world, the counterpart user 220 and the target user(s) 222 are separated or obstructed from seeing one another by solid physical matter, such as a building or other users. Some elements of FIGS. 4A-4B may comprise similar elements of FIGS. 2-3, and thus the same or similar reference numbers may be utilized.

In scenario 400a of FIG. 4A, a target user 222 wearing a user device 224 is located behind a building 402, while a notification in the form of a highlighted marker 404 is sent by the server to a counterpart user 220 located in front of the building 402 and is perceived within the field of view 406 of said counterpart user 220 through the walls of the building 402. In this example, the server may virtually add transparency to the respective 3D structure data of the solid physical building 402 stored in the persistent virtual world system, so for the counterpart user 220 the building 402, or at least the relevant portions of the building 402 where the target user 222 is located, may look transparent. The counterpart user 220 may, upon seeing such a notification in the form of the highlighted marker 404, proceed to apply a form of interaction on the marker 404 of the target user 222, by, for example, making hand or finger movements to virtually click on the marker 404. In some embodiments, the target user 222 may thereafter receive a notification of such an attempt to reach out in the form of an invitation to open up a communication channel, which the target user 222 may be entitled to accept or refuse. Likewise, during communications between the users, the communications can be perceived (e.g., heard or seen) through the building 402.

In scenario 400b of FIG. 4B, a plurality of target users 222a-d are part of a crowd 408 located within the field of view 406 of a counterpart user 220. Further in scenario 400b, the system may provide a notification to counterpart user 220 only about the presence of target users 222c-d based on one or more rules from a notification set of rules, such as notification set of rules 216 of FIG. 3. The notification may be sent, for example, through the highlighted marker 404 placed upon the target users 222c-d. Furthermore, the notification may be perceived by the counterpart user 220, such as through the virtual replicas of target users a-b and e-f that may be stored in the persistent virtual world system.

In some embodiments, the marker 404 may be an interactive virtual shape generated by retrieving from the persistent virtual world system the respective user's virtual replica. In other embodiments, the marker 404 may further be any other type of interactive virtual shape, such as one of a pointer, an icon positioned on top of the target user, an outline, and the like. Selection of the type of marker 404 may be configured by a system administrator or by the target user himself by accessing the system through a user device connected through the network.

Figure 5:
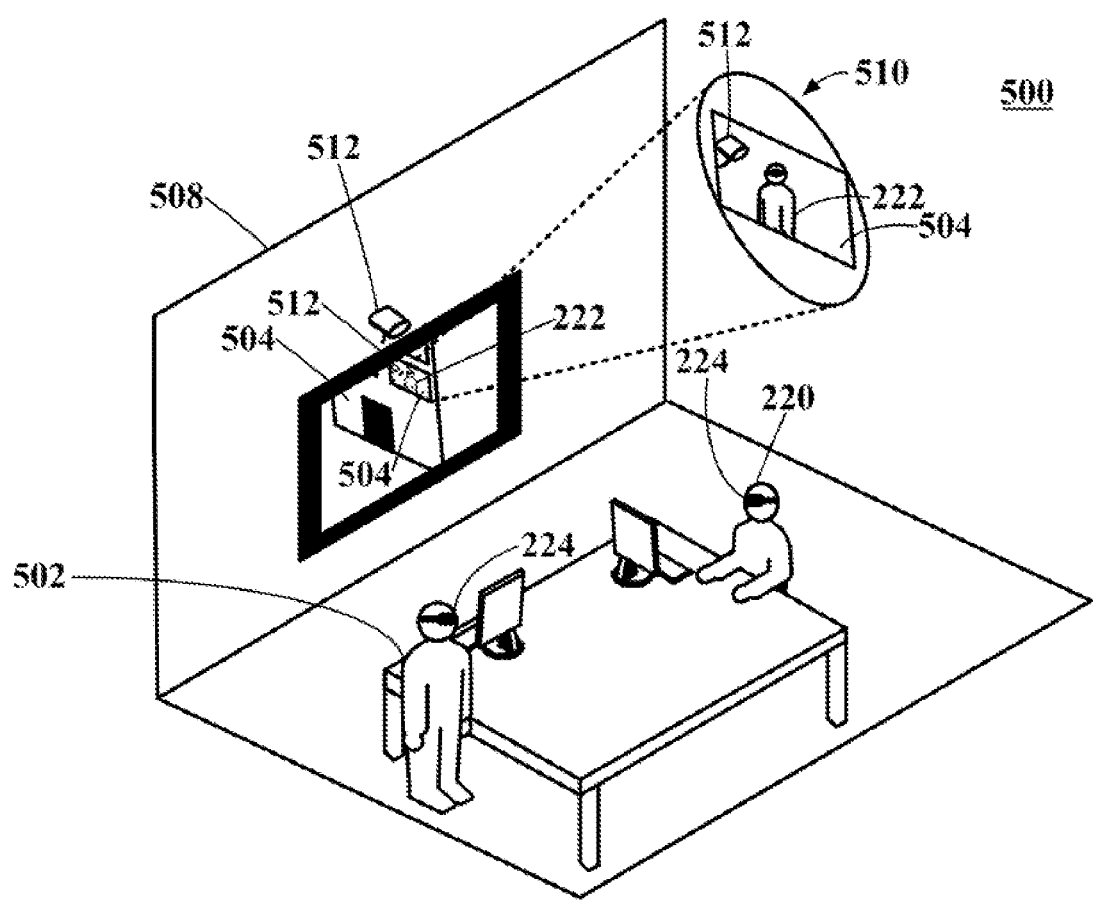
FIG. 5 depicts a sample embodiment wherein a life-size virtual replica of a target user is placed in front of a counterpart user to simulate close-range communication.

FIG. 5 depicts a schematic representation of sample scenario 500 showing the embodiment of a life-size virtual replica 502 of a target user 222 placed in front of a counterpart user 220 to simulate close-range communication. Some elements of FIG. 5 may comprise similar elements of FIGS. 2-4B, and thus the same or similar reference numbers may be utilized.

In scenario 500 of FIG. 5, the target user 222 is located in an office 504 within a building 506 proximate to an office 508 of the counterpart user 220. A zoom-in view 510 displaying the target user 222 in the neighboring office 504 is further presented. The server may have sent a notification to the counterpart user 220 about the current presence of the target user 222 next to a window from the office 504. The notification may be sent, for example, in the form of an augmentation or highlight of a marker of the target user 222, which the counterpart user 220 may interact with by hand or finger movements, clicks, swipes, or through other types of interactions. Furthermore, the notification may be sent based on one rules from a notification set of rules, such as notification set of rules 216 of FIG. 3. In some embodiments, interactions with the marker of the target user 222 may trigger the server to send an invitation to the target user 222 for, if the target user 222 accepts the invitation, opening up a communications channel with the counterpart user 220. In the scenario 500, the users may further receive the option of placing the life-size virtual replica 502 of the target user 222 next to the counterpart user 220 in order to simulate close-range communications.

In yet a further embodiment, during communications between the counterpart user 220 and target user 222, the server is further configured to retrieve sensor data from sensors on user devices 224 (e.g., from the counterpart user device, or the target user device, or combinations thereof), from external sensor devices (e.g., from a camera 512), or from combinations thereof. The sensor data may be associated to facial expressions and body language of the users. The sensor data may further comprise visual or other type of sensor data associated to the real-world location where the users are located. The server may be further configured to update the life-size virtual replica of the corresponding users, such as the life-size virtual replica 502 of the target user 222, as well as the location where the users are located. In other examples, the sensor data may be retrieved from visual sensors included in cameras such as RGBD cameras, depth cameras, LIDAR cameras, CCTV cameras depth cameras, SLAM scanners, or Internet of Things devices installed close to the users using artificial intelligence-based machine vision for scanning and recognizing human expressions. Since the life-size virtual replica 502 is updated in real-time through the sensor data, the facial expressions and body language of the target user 222 may be simulated right in front of the counterpart user 220, enhancing communications between each other. Likewise, in virtual reality, the users may also have the option to bring each other closer for simulating a close-range communication. For example, from the perspective of the target user 222, the communication may be being held in virtual reality, such that the target user 222 may view the virtual replica of the office 508 of the counterpart user 220 as well as a life-size virtual replica of the counterpart user 220.

In alternative embodiments related to situations where sensor devices may not be available (e.g., in appropriate locations or with sufficient sensor capabilities) to scan and output on the life-size virtual replica the corresponding user expressions, the server can be further configured to simulate expressions based on the tone of voice of the target user 222 and the words uttered by the target user 222, which may be achieved by training artificial intelligence algorithms with a plurality of labelled and/or unlabeled data sets comprising samples of voice tones and associated corresponding expressions.

Figure 6:
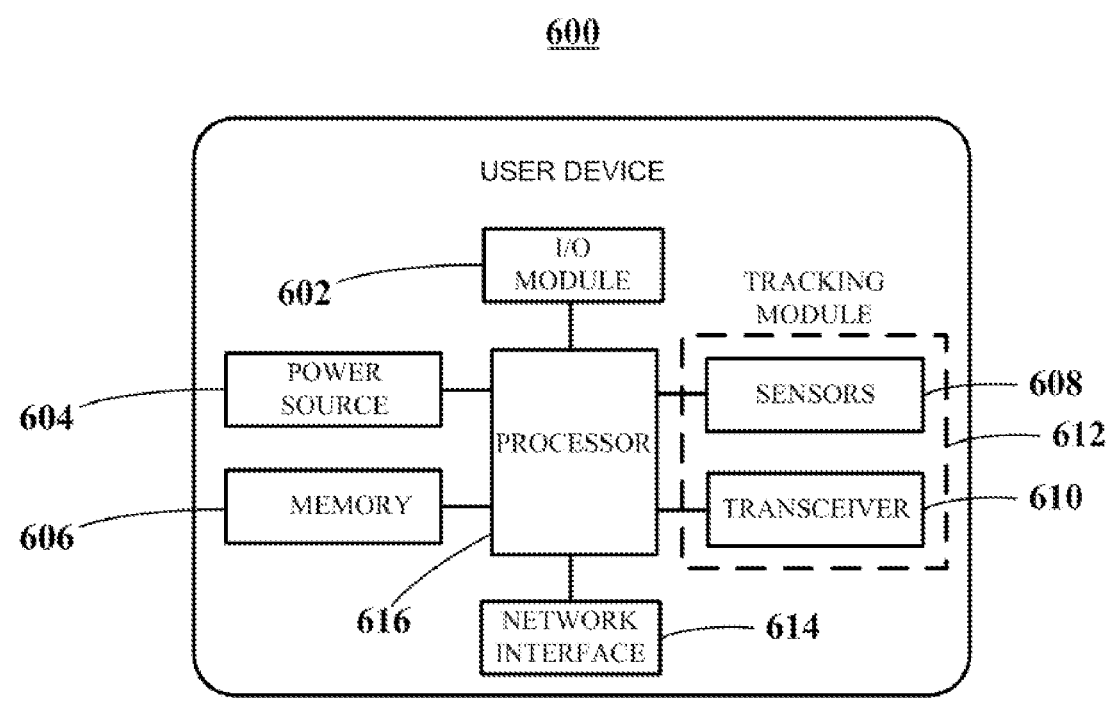
FIG. 6 depicts a sample user device that may be used according to embodiments of the current disclosure.

FIG. 6 depicts a sample user device that may be used according to embodiments of the current disclosure.

A user device 600 of the current disclosure may include operational components such as an input/output (I/O) module 602; a power source 604; a memory 606; sensors 608 and transceivers 610 forming a tracking module 612; and a network interface 614, all operatively connected to a processor 616.

The I/O module 602 is implemented as computing hardware and software configured to interact with users and provide user input data to one or more other system components. For example, I/O module 602 may be configured to interact with users, generate user input data based on the interaction, and provide the user input data to the processor 616 before being transferred to other processing systems via a network, such as to a server. In another example, I/O modules 602 is implemented as an external computing pointing device (e.g., a touch screen, mouse, 3D control, joystick, gamepad, and the like) and/or text entry device (e.g., a keyboard, dictation tool, and the like) configured to interact with device 602. In yet other embodiments, I/O module 602 may provide additional, fewer, or different functionality to that described above.

The power source 604 is implemented as computing hardware and software configured to provide power to the devices 602. In one embodiment, the power source 604 may be a battery. The power source 604 may be built into the devices 602 or removable from the devices 602, and may be rechargeable or non-rechargeable. In one embodiment, the devices 602 may be repowered by replacing one power source 604 with another power source 604. In another embodiment, the power source 604 may be recharged by a cable attached to a charging source, such as a universal serial bus ("USB") FireWire, Ethernet, Thunderbolt, or headphone cable, attached to a personal computer. In yet another embodiment, the power source 604 may be recharged by inductive charging, wherein an electromagnetic field is used to transfer energy from an inductive charger to the power source 604 when the two are brought in close proximity, but need not be plugged into one another via a cable. In another embodiment, a docking station may be used to facilitate charging.

The memory 606 may be implemented as computing hardware and software adapted to store application program instructions and to store sensor data captured by the plurality of sensing mechanisms. The memory 606 may be of any suitable type capable of storing information accessible by the processor 616, including a computer-readable medium, or other medium that stores data that may be read with the aid of an electronic device, such as a hard-drive, memory card, flash drive, ROM, RAM, DVD or other optical disks, as well as other write-capable and read-only memories. The memory 606 may include temporary storage in addition to persistent storage.

The sensors 608 may be implemented as computing hardware and software adapted to obtain various sensor data from the real world and determine/track the position and orientation of the user devices 600. The sensors may include, without limitations, one or more include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensors include one or more visual sensors configured within one or more cameras, and further comprise Inertia Measuring Units (IMUs), accelerometers, and gyroscopes. The IMU is configured to measure and report the velocity, acceleration, angular momentum, speed of translation, speed of rotation, and other telemetry metadata of devices 602 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 610 may be implemented as computing hardware and software configured to enable devices 602 to receive wireless radio waves from antennas and to send the data back to the antennas. In some embodiments, mmW transceivers may be employed, which may be configured to receive mmW wave signals from antennas and to send the data back to antennas when interacting with immersive content. The transceiver 610 may be a two-way communication transceiver 610.

In an embodiment, the tracking module 612 may be implemented by combining the capabilities of the IMU, accelerometers, and gyroscopes with the positional tracking provided by the transceivers 610 and the accurate tracking, low-latency and high QOS functionalities provided by mmW-based antennas may enable sub-centimeter or sub-millimeter positional and orientational tracking, which may increase accuracy when tracking the real-time position and orientation of devices 602. In alternative embodiments, the sensing mechanisms and transceivers 610 may be coupled together in a single tracking module device.

The network interface 614 may be implemented as computing software and hardware to communicatively connect to a network, receive computer readable program instructions from the network sent by the server or by device 602, and forward the computer readable program instructions for storage in the memory 606 for execution by the processor 616.

The processor 616 may be implemented as computing hardware and software configured to receive and process sensor data. For example, the processor 616 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 616 may receive user input data from I/O module 602 and may respectively implement application programs stored in the memory 606. In other examples, the processor 616 may receive sensor data from sensing mechanisms captured from the real world, or may receive an accurate position and orientation of devices 602 through the tracking module 612, and may prepare some of the data before sending the data to a server for further processing. As way of example, the processor 616 may realize some of the steps required during data preparation including analog or digital signal processing algorithms such as raw data reduction or filtering of sensor data before sending the data to a server.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The embodiments of the invention in which an exclusive property or privilege is claimed are defined as follows:

1. A method for enabling communication in a virtual world system implemented by a server comprising memory and at least one processor, the method comprising:
   generating a marker of a target user that is associated with the target user and presented in the virtual world system;
   detecting presence in the virtual world system of a target user device and a counterpart user device connected to the server via a wireless network;
   sending a notification to the counterpart user device informing about the presence of the target user device in the virtual world system based on a set of rules, wherein the notification sent to the counterpart user device is made perceptible by virtually adding transparency to 3D structure data in the virtual world system, and wherein the notification is in the form of a highlighted version of the marker of the target user that is visible within a field of view of a user of the counterpart user device through an object corresponding to the 3D structure data to which the transparency has been added;
   receiving one or more forms of interaction from the counterpart user device on the marker of the target user in the virtual world system;
   opening up a communication channel between the counterpart user device and the target user device responsive to the one or more received forms of interaction; and
   receiving and directing communications between the counterpart user device and the target user device via the communication channel.

2. The method of claim 1, wherein the marker comprises an interactive virtual shape generated from a virtual replica of the target user retrieved from the virtual world system.

3. The method of claim 2, further comprising, during communications between the user of the counterpart user device and the target user:
   retrieving, by the server, sensor data associated with facial expressions or body language of the users; and
   updating the versions of the virtual replica of the corresponding users based on the sensor data.

4. The method of claim 2, further comprising virtually placing the versions of the virtual replicas in spatial proximity to simulate a close-range communication.

5. The method of claim 1, wherein the marker is one of a pointer, an icon positioned on top of the target user, or an outline.

6. The method of claim 1, wherein the notification to the counterpart user device is performed by virtually augmenting the marker of the target user with at least one distinctive characteristic comprising one or more distinctive colors, lighting effects, sounds, shapes, haptic sensations, or combinations thereof perceptible through the counterpart user device.

7. The method of claim 1, wherein the set of rules comprises specific entitlements based on social connections between users, interest zones comprising one or more interests assigned to one or more predetermined geographic zones, individual user interests, a distance factor, availability configuration settings, or combinations thereof.

8. The method of claim 1, wherein opening up the communication channel between the counterpart user device and target user device responsive to the one or more received forms of interaction comprises:
   generating and sending an invitation to the target user device; and
   if the invited target user accepts the invitation, receiving, from the invited target user, an invitation confirmation.

9. The method of claim 1, wherein communications are enabled between human users, artificial reality users, or combinations thereof, through communication channels enabling communication through sharing of audio, video, text, hand or facial gestures, or movements.

10. A system for enabling communication in a virtual world system, the system comprising:
    a server comprising memory and at least one processor, the memory comprising instructions that, when executed by the at least one processor, trigger the at least one processor to:
    generate a marker of a target user that is associated with the target user and presented in the virtual world system;

detect presence in the virtual world system of a target user device and counterpart user device connected to the server via a wireless network;

send a notification to the counterpart user device informing about the presence of the target user device in the virtual world system based on a set of rules, wherein the notification sent to the counterpart user device is made perceptible by virtually adding transparency to 3D structure data in the virtual world system, and wherein the notification is in the form of a highlighted version of the marker of the target user that is visible within a field of view of a user of the counterpart user device through an object corresponding to the 3D structure data to which the transparency has been added;

receive one or more forms of interaction from the counterpart user device on the marker of the target user in the virtual world system;

open up a communication channel between the counterpart user device and the target user device responsive to the one or more received forms of interaction; and receive and direct communication between the counterpart user device and the target user device via the communication channel.

11. The system of claim 10, wherein the marker comprises an interactive virtual shape generated from a virtual replica of the target user retrieved from the virtual world system.

12. The system of claim 11, wherein the server is further configured to:

retrieve sensor data associated with facial expressions or body language of the users;

update the versions of the virtual replicas of the corresponding users based on the sensor data; and place the versions of the virtual replicas to simulate a close-range communication.

13. The system of claim 10, wherein the set of rules comprises specific entitlements based on social connections between users, interest zones comprising one or more interests assigned to one or more predetermined geographic zones, individual user interests, a distance factor, availability configuration settings, or combinations thereof.

14. The system of claim 10, wherein the one or more forms of interaction comprise at least one of looking, pointing, clicking, grabbing, pinching, swiping, interaction through voice, interaction through text, hand or facial gestures or movements, or combinations thereof.

15. The system of claim 10, wherein the communications enable group interactions of more than two users.

16. One or more non-transitory computer-readable media having stored thereon instructions configured to cause a server computer system comprising memory and at least one processor to perform a method for enabling communication in a virtual world system, comprising the steps of:

generating a marker of respective users from a plurality of positional and orientational data points obtained from a first user device and a target user device;

detecting presence in the virtual world system of the first user device and the target user device connected to the server via a wireless network;

sending a notification to the first user device informing about the presence of the target user device in the virtual world system based on a set of rules, wherein the notification sent to the first user device is made perceptible by virtually adding transparency to 3D structure data in the virtual world system, and wherein the notification is in the form of a highlighted version of a marker of a target user that is visible within a field of view of a user of the counterpart user device through an object corresponding to the 3D structure data to which the transparency has been added;

receiving a form of interaction from the first user device on the marker of the target user in the virtual world system;

opening up a communication channel between the first user device and the target user device in response to the received form of interaction; and receiving and directing communication between the first user device and the target user device via the communication channel.

17. The non-transitory computer-readable medium of claim 16, wherein the marker of the target user comprises an interactive virtual shape generated from a virtual replica of the target user retrieved from the virtual world system.

18. The non-transitory computer-readable medium of claim 16, wherein the instructions are further configured to cause the server computer system to retrieve sensor data associated with facial expressions or body language of the users and update the versions of the virtual replica of the corresponding users based on the sensor data.

* * * * *